United States Patent
Wagner et al.

(10) Patent No.: US 6,989,423 B2
(45) Date of Patent: Jan. 24, 2006

(54) OXYGEN TAILORING OF POLYETHYLENE FILM RESINS

(75) Inventors: James E. Wagner, Houston, TX (US); Jerry M. Johnson, League City, TX (US); Dale J. Joy, Wimberley, TX (US); Wesley J. Robertson, Humble, TX (US); Timothy J. Cowell, Houston, TX (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 42 days.

(21) Appl. No.: 10/612,747

(22) Filed: Jul. 2, 2003

(65) Prior Publication Data

US 2004/0039131 A1 Feb. 26, 2004

Related U.S. Application Data

(60) Provisional application No. 60/393,939, filed on Jul. 3, 2002.

(51) Int. Cl.
*C08F 8/00* (2006.01)

(52) U.S. Cl. .................. 525/333.8; 525/388; 525/938; 524/576; 524/585; 524/587

(58) Field of Classification Search .............. 525/333.8, 525/388, 938; 524/576, 585, 587
See application file for complete search history.

(56) References Cited

U.S. PATENT DOCUMENTS

| 3,826,780 A | 7/1974 | Kiss et al. ............. 260/45.85 B |
| 5,405,917 A | 4/1995 | Mueller, Jr. et al. ..... 525/333.8 |
| 5,651,927 A | 7/1997 | Auda et al. ................... 264/85 |
| 5,728,335 A | 3/1998 | Neubauer .................... 264/83 |
| 5,739,266 A | 4/1998 | Piana ......................... 528/483 |
| 6,147,167 A | 11/2000 | Mack et al. ............. 525/333.8 |

FOREIGN PATENT DOCUMENTS

| DE | 1 495 275 | 3/1969 |
| DE | 2524252 | 2/1976 |
| DE | 4413093 | 10/1995 |
| EP | 0 457 441 A2 | 11/1991 |
| WO | WO 97/49737 | 12/1997 |
| WO | WO 01/96419 A2 | 12/2001 |
| WO | WO 03/047839 | 6/2003 |

*Primary Examiner*—Fred Teskin
(74) *Attorney, Agent, or Firm*—Maria C. Walsh; Andrew B. Griffis

(57) ABSTRACT

Processes are disclosed for oxygen-tailoring polyethylene resin. Polyethylene resin is conveyed through a feed zone, a melt-mixing zone and a melt zone. The resin is contacted with oxygen in an amount of at least 40 parts by weight $O_2$ per million parts by weight resin, and contacted with primary antioxidant downstream of the point or points of oxygen contact. The oxygen-treated resin can be used to make polyethylene film having improved gauge uniformity.

45 Claims, 2 Drawing Sheets

OXYGEN TAILORING OF POLYETHYLENE FILM RESINS

1. CROSS-REFERENCE TO RELATED APPLICATION

This application claims the benefit U.S. Provisional Application No. 60/393,939, filed Jul. 3, 2002, and incorporated herein by reference.

2. FIELD OF THE INVENTION

The present invention is directed to methods of extruding polyethylene homopolymer and copolymer resins. More particularly, the invention provides methods of oxygen tailoring polyethylene resins to improve the gauge uniformity of films made from such resins.

3. BACKGROUND

Tailoring of resins, such as polyethylene homopolymer or copolymer resins, is a well-known method of altering the molecular architecture and thus the bulk properties of the resin and of films and articles made therefrom. Tailoring involves treating the resin with an agent, such as a peroxide or oxygen, capable of controlled degradation of the resin. The effect of tailoring on the resin rheological properties can be seen in an increase in shear thinning behavior, an increase in elasticity, an increase in melt tension, a reduction in swelling during blow molding, and an increase in bubble stability film blowing. Although not wishing to be bound by theory, it is believed that an effect of tailoring is to introduce low levels of long chain branching in the resin.

A particularly useful application for polyethylene resins is in films. The gauge uniformity of films, particularly films of medium density polyethylene (MDPE) and high density polyethylene (HDPE) resins, frequently is not adequate for producing the thin films required for many applications. Attempts have been made to tailor polyethylene resins to improve resin or film properties; see, e.g., European Patent Publication No. EP 0 457 441, and U.S. Pat. Nos. 5,728,335; 5,739,266; and 6,147,167. However, it would be desirable to have improved methods of extruding polyethylene, particularly pelletized medium or high density polyethylene film resin, to provide resins having improved gauge uniformity when processed into film.

4. SUMMARY

In one embodiment, the present invention provides a process for oxygen-tailoring polyethylene resin. The process includes conveying polyethylene homopolymer or copolymer resin in a downstream direction through a feed zone, a melt-mixing zone downstream of the feed zone, and a melt zone downstream of the melt-mixing zone; contacting the resin with oxygen in an amount of at least 40 parts by weight $O_2$ per million parts by weight resin (ppm (wt) $O_2$); and contacting the resin with primary antioxidant. The resin is contacted with primary antioxidant downstream of the point or points of contact with oxygen. The resin can further be pelletized. In a particular embodiment, the pelletized, oxygen-treated resin is used to make a polyethylene film having improved gauge uniformity.

In another embodiment, the invention provides a process for oxygen-tailoring polyethylene resin by conveying polyethylene resin having an initial value of G"/G' ($\tan(\delta)_i$) in a downstream direction through a feed zone, a melt-mixing zone downstream of the feed zone, and a melt zone downstream of the melt-mixing zone; contacting the resin with oxygen in an amount of at least 40 parts by weight $O_2$ per million parts by weight resin (ppm (wt) $O_2$); and contacting the oxygen-contacted resin with primary antioxidant, to produce polyethylene resin having a final value of G"/G' ($\tan(\delta)_f$). The initial and final values of $\tan(\delta)$ define a relative change $\Delta \tan(\delta)$:

$$\Delta\tan(\delta) = \frac{\tan(\delta)_i - \tan(\delta)_f}{\tan(\delta)_i}$$

the value of which is less than 15%, preferably less than 14%, more preferably less than 13% and yet even more preferably less than 12%. In a still more preferable embodiment the value is between about 12% and about 10%.

In another embodiment, the invention provides a process for oxygen-tailoring a high density polyethylene resin having a bimodal molecular weight distribution. The process includes conveying polyethylene resin having a density of at least 0.945 g/cm³, a ratio $M_w/M_n$ of at least 15, and an initial value of G"/G' ($\tan(\delta)_i$) in a downstream direction through a feed zone, a melt-mixing zone downstream of the feed zone, and a melt zone downstream of the melt-mixing zone; contacting the resin in the melt-mixing zone with oxygen in an amount of from 40 to 300 parts by weight $O_2$ per million parts by weight resin (ppm (wt) $O_2$); and contacting the oxygen-contacted resin in the melt zone with primary antioxidant to produce polyethylene resin having a final value of G"/G' ($\tan(\delta)_f$), wherein the change $\Delta$ in $\tan(\delta)$ defined by $$\Delta\tan(\delta) = \frac{\tan(\delta)_i - \tan(\delta)_f}{\tan(\delta)_i}$$

is less than 15%, preferably less than 14%, more preferably less than 13% and yet even more preferably less than 12%. In a still more preferable embodiment the value is between about 12% and about 10%. The primary antioxidant can be phenolic antioxidant, hindered amine antioxidant, or a mixture thereof.

In other embodiments, the invention provides polyethylene resin formed by the inventive processes, and polyethylene films formed of or including such resins.

5. BRIEF DESCRIPTION OF THE DRAWINGS

6. DETAILED DESCRIPTION

Figure 1:
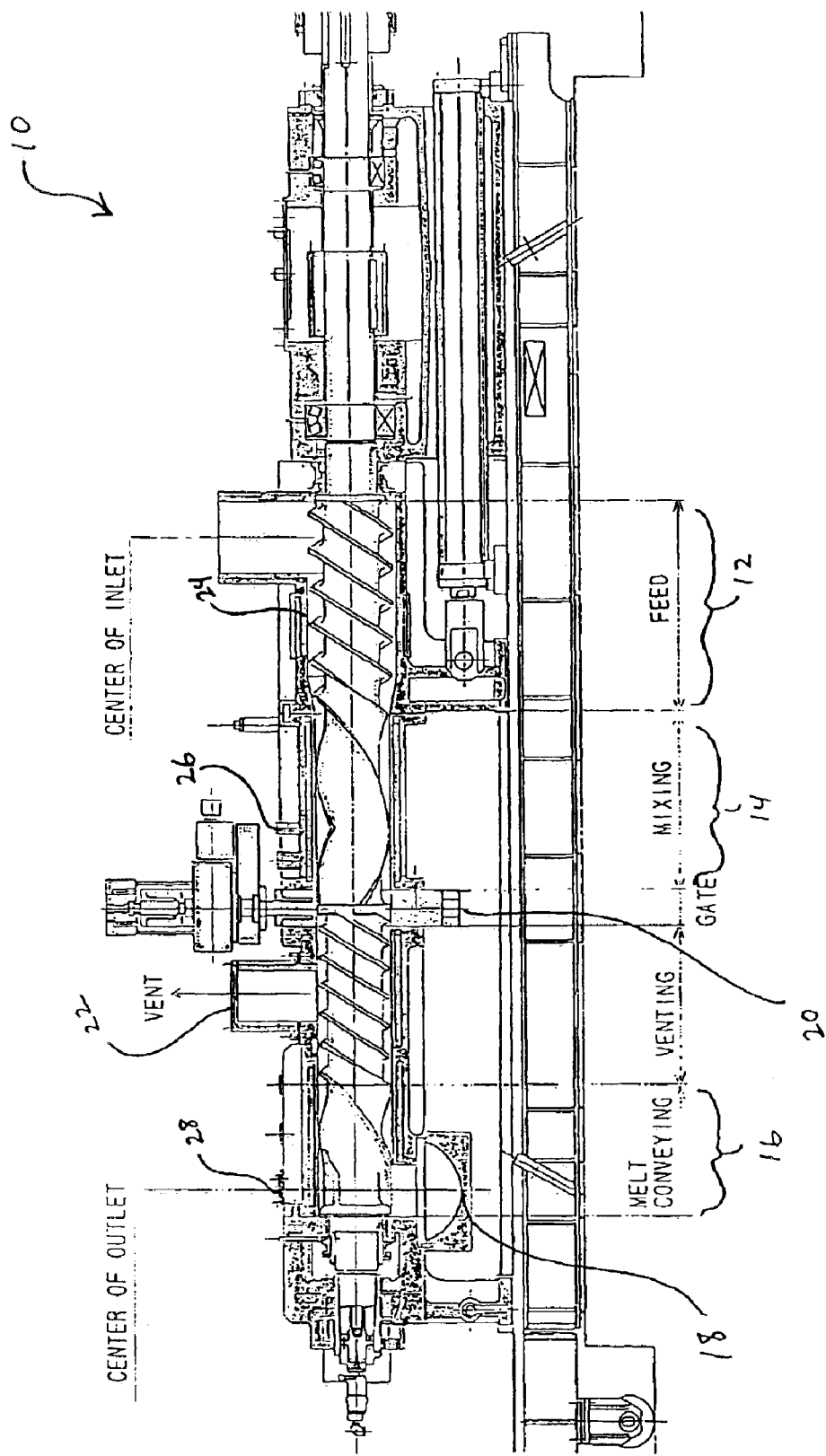
FIG. 1 is a schematic diagram of a Kobe mixer.

The polyethylene resin to be oxygen-tailored can be a polyethylene homopolymer or copolymer of ethylene and one or more $C_3$–$C_{20}$ alpha-olefin comonomers. As used herein, the term "ethylene copolymer" indicates a polymer formed of more than 50 mol % polymerized ethylene units, and the remaining less than 50 mol % polymerized units being polymerized α-olefin comonomers, such as $C_3$–$C_{20}$ α-olefins or $C_3$–$C_{12}$ α-olefins. Suitable α-olefin comonomers can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

Optionally, other comonomers can be used in minor amounts, such as less than 5 mol %, and such minor comonomers include polar vinyl, conjugated and non-conjugated dienes, acetylene and aldehyde monomers. Non-conjugated dienes useful as comonomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene.

The polyethylene resin can be any resin capable of melt extrusion, and can have a density of from 0.890 to 0.970 g/cm$^3$. In a particular embodiment, the polyethylene resin is a low density polyethylene ("LDPE") having a density in the range of 0.916–0.940 g/cm$^3$. LDPE is also known as "branched" or "heterogeneously branched" polyethylene because of the relatively large number of long chain branches extending from the main polymer backbone. LDPE can be prepared at high pressure using free radical initiators. Relatively higher density LDPE, typically in the range of 0.928 to 0.940 g/cm$^3$, is sometimes referred to as medium density polyethylene ("MDPE"). In another embodiment, the polyethylene resin is an MDPE resin produced in a gas phase or a in a slurry process. Polyethylene in the same density range, i.e., 0.916 to 0.940 g/cm$^3$, which is linear and does not contain long chain branching is also known; this "linear low density polyethylene" ("LLDPE") can be produced with conventional Ziegler-Natta catalysts or with metallocene catalysts. In another embodiment, the polyethylene resin is an LLDPE. Polyethylenes having still greater density are the high density polyethylenes ("HDPEs"), i.e., polyethylenes having densities greater than 0.940 g/m$^3$, and are generally prepared with Ziegler-Natta catalysts. In another embodiment, the polyethylene resin is an HDPE. In any of these embodiments, the polyethylene resin can also be a mixture of two or more polyethylenes.

In one embodiment, the polyethylene resin is a medium or high density resin having a relatively higher molecular weight (HMW) component and a relatively lower molecular weight (LMW) component. Such resins can be characterized by a bimodal molecular weight distribution function, i.e., a plot of weight fraction versus molecular weight that is a convolution of at least two distribution functions of differing average molecular weight. It should be appreciated that the maxima of the two distribution functions can be resolved or can appear as a single broad maximum, depending upon the shapes of the distribution functions, the difference in average molecular weight, and the relative amounts of the two components. Thus, resins having a broad molecular weight distribution function which is a convolution of at least an HMW component and an LMW component are termed "bimodal", and their convoluted distribution function termed "bimodal" regardless of whether their individual maxima can be resolved.

In one embodiment, the polyethylene resin is an MDPE resin having a bimodal molecular weight distribution, wherein a plot of the distribution includes a single broad maximum which is an unresolved convolution of at least an HMW and an LMW component.

In another embodiment, the polyethylene resin is an MDPE resin having a bimodal molecular weight distribution, wherein a plot of the distribution includes a two maxima attributable to an HMW and an LMW component.

In another embodiment, the polyethylene resin is an HDPE resin having a bimodal molecular weight distribution, wherein a plot of the distribution includes a single broad maximum which is an unresolved convolution of at least an HMW and an LMW component.

In another embodiment, the polyethylene resin is an HDPE resin having a bimodal molecular weight distribution, wherein a plot of the distribution includes a two maxima attributable to an HMW and an LMW component.

Bimodal resins can be produced in tandem reactors, such as tandem gas phase reactors or tandem slurry reactors. Alternatively, bimetallic catalysts such as those disclosed in U.S. Pat. Nos. 5,032,562 and 5,525,678, and European Patent EP 0 729 387, can produce bimodal polyolefin resins in a single reactor. These catalysts typically include a non-metallocene catalyst component and a metallocene catalyst component which produce polyolefins having different average molecular weights. U.S. Pat. No. 5,525,678, for example, discloses a bimetallic catalyst in one embodiment including a titanium non-metallocene component which produces a higher molecular weight resin, and a zirconium metallocene component which produces a lower molecular weight resin. Controlling the relative amounts of each catalyst in a reactor, or the relative reactivities of the different catalysts, allows control of the bimodal product resin.

Alternatively, the bimodal resin can be a blend of two or more resins, the blend being formed by mixing the resins in a conventional mixer, such as a Banbury mixer.

In a particular embodiment, the bimodal resin is an HDPE resin produced in a series of two stirred slurry reactors using Ziegler-Natta catalyst, wherein an HMW component is produced in a first reactor and an LMW component is produced in a second reactor in series with the first reactor, or the LMW component produced in the first reactor and the HMW component produced in the second reactor in series with the first reactor. If desired, hydrogen can be added as a chain-termination agent to control molecular weight, and the amount of hydrogen used in each reactor can be different. Typical operating pressures are less than about 1 MPa, and typical operating temperatures are from about 70–90 C. Series reactors and slurry processes for producing polyethylene resins therein are well-known in the art.

The polyethylene resin is processed in a mixer, such as a co- or counter-rotating, intermeshing or non-intermeshing twin screw mixer. Such mixers are well-known in the art, and are commercially available from various sources, such as Kobe and Farrel. The resin is fed to the feeding zone of the mixer, where the temperature is below the melting temperature of the resin as the resin is compressed and conveyed toward the melt-mixing zone. Typically, the temperature in the feeding zone is 20 to 100 C, and is maintained by cooling the extruder walls. In the melt-mixing zone, the temperature is increased to at least partially melt the resin. In the melt zone, the temperature is sufficient to melt essentially all of the resin, to provide a molten polyethylene resin. Each zone is only partially filled with the resin; i.e., there are no completely filled zones. Although the terms "mixer" and "extruder" are often used loosely and interchangeably, one skilled in the art will appreciate that mixers, such as the commercially available Kobe or Farrel mixers, operate at relatively low pressures, typically about 100 psi or less, and the zones within the mixer are generally not completely filled with resin. In contrast, extruders, such as are commercially available from, for example, Werner-Pfleiderer, operate at much higher pressures, typically at least several hundred or several thousand psi, and the various zones within the extruder are generally completely filled with resin.

Although not limited to any particular mixer, a process of the invention is illustrated now by specific reference to FIG. 1, showing a schematic diagram of a Kobe mixer 10. Mixer 10 includes a feed zone 12, a mixing zone 14, and a melt-conveying zone 16. Resin and optional additives are provided to mixer 10 in the feed zone 12, and the resin is conveyed in a downstream direction through the mixing zone 14 and the melt-conveying zone 16. Gate 20 separates the mixing zone 24 from the melt-conveying zone 16. An optional vent 22 is shown in FIG. 1 in the melt-conveying zone 16. As described above, the resin is generally at least partially melted in mixing zone 14, and generally, but not necessarily, essentially completely melted in melt-conveying zone 16. The resin is conveyed through the mixer discharge 18 and further processed, such as by pelletizing.

Figure 2:
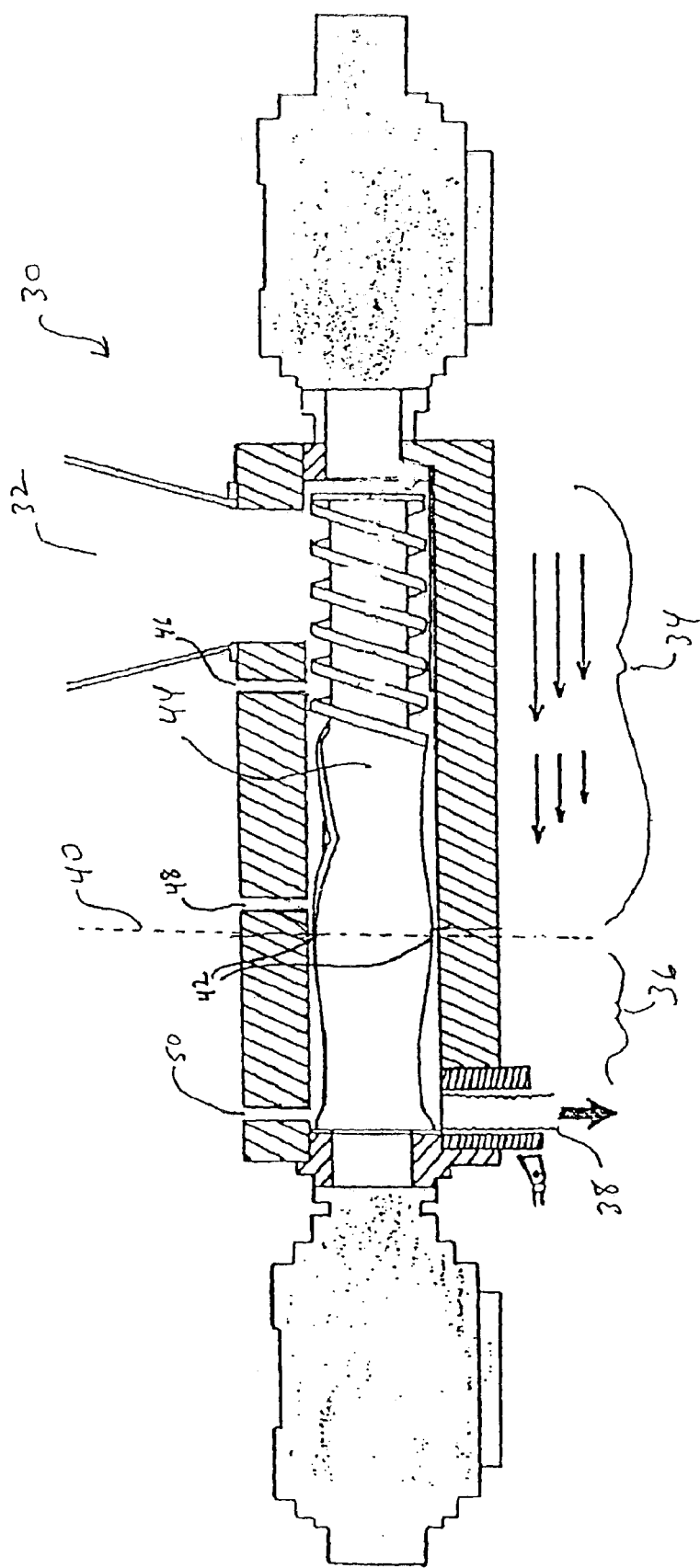
FIG. 2 is a schematic diagram of a Farrel mixer.

Turning now to FIG. 2, specific reference is made to a Farrel mixer 30. Mixer 30 includes a feed zone 32, a mixing zone 34, and a melt-conveying zone 36. Resin and optional additives are provided to mixer 30 in the feed zone 32, and the resin is conveyed in a downstream direction through the mixing zone 34 and the melt-conveying zone 36. As described above, the resin is generally at least partially melted in mixing zone 34, and generally, but not necessarily, essentially completely melted in melt-conveying zone 36. The resin is conveyed through the mixer (discharge 38 and further processed, such as by pelletizing. The Farrel mixer does not have a gate such as gate 20 of the Kobe mixer separating the mixing zone from the melt-conveying zone. However, mixing zone 34 and melt-conveying zone 36 are effectively separated by a narrow clearance region shown by dashed line 40 corresponding to the apex 42 of mixing element 44.

The resin can be processed at a melt temperature of from a lower limit of 220° F. (104 C) or 240 F (116 C) or 260 F (127 C) or 280 F (138 C) or 300° (149 C) to an upper limit of less than 430 F (221 C) or less than 420 F (216 C) or less than 410 F (210 C) or less than 400 F (204 C); where the melt temperature is the temperature at the downstream end of the mixing zone. For example, in FIG. 1, the melt temperature is the temperature at gate 20, and in FIG. 2, the melt temperature is the temperature at the apex 42.

It should be appreciated that mixers other than the Kobe and Farrel mixers illustrated herein can be used.

The resin is contacted with oxygen and, farther downstream, with primary antioxidant. Oxygen can be provided in the feed zone, the mixing zone or the melt-conveying zone, or in more than one of such zones. In any zone in which oxygen is provided, the oxygen can be provided, for example, through one or more gas inlet ports. Referring to FIG. 1, for example, in some embodiments, oxygen can be provided through one or both of inlets 24 and 26. Referring to FIG. 2, for example, in some embodiments, oxygen can be provided through one or both of inlets 46 and 48. It should be appreciated that these specific inlet positions are merely exemplary.

Oxygen can be provided as a continuous flow of gas or, alternatively, oxygen can be provided intermittently.

Oxygen gas can be provided as an essentially pure gas, or as part of a gas mixture, such as air.

The amount of oxygen used can be expressed as parts by weight of $O_2$ per million parts by weight of resin, abbreviated as ppm (wt) $O_2$. For a system in which the oxygen is provided as a continuous flow, the amount of oxygen in units of ppm (wt) O2 can be calculated by normalizing the oxygen mass flow rate to the resin mass flow rate. The oxygen mass flow rate can be measured using a conventional gas mass flow meter. For example, in Example 9 herein, polyethylene resin was processed in a commercial-scale Kobe mixer operating at a resin mass flow rate of 58,000 lb/hr (26,300 kg/hr). The source of oxygen was dry air, having an $O_2$ content of 23 wt %, and the oxygen mass flow rate was 30 lb/hr (13.6 kg/hr). The normalized oxygen amount is calculated as:

$$\text{ppm(wt)}\, O_2 = \frac{30 \text{ lb air/hr}}{58{,}000 \text{ lb resin/hr}} \times 0.23 \text{ lb } O_2/\text{lb air} =$$
$$1.19 \times 10^{-4} \text{ lb air/lb resin}$$
$$= 1.19 \text{ ppm(wt)}\, O_2$$

The analogous calculation using SI units gives the same value, since the mass units cancel.

Oxygen can be provided in an amount of at least 40 ppm (wt) $O_2$, or at least 60 ppm (wt) $O_2$, or at least 80 ppm (wt) $O_2$, or at least 100 ppm (wt) $O_2$. The upper limit of the oxygen amount depends on the degree of oxygen tailoring desired. If too much oxygen is used, an unacceptable amount of resin degradation will occur, as evidenced by a loss in various film properties, particularly in dart drop impact strength. Generally, the amount of oxygen will be up to 300 ppm (wt) $O_2$, or up to 280 ppm (wt) $O_2$, or up to 260 ppm (wt) $O_2$, or up to 240 ppm (wt) $O_2$, or up to 220 ppm (wt) $O_2$, or up to 200 ppm (wt) $O_2$. Ranges from any recited lower limit to any recited upper limit are also contemplated.

After contacting with oxygen, the oxygen-contacted resin is contacted farther downstream with primary antioxidant. Primary antioxidant can be provided in one or more zones, through one or more inlets, provided that primary antioxidant addition occurs downstream of oxygen addition. Referring to FIG. 1, primary antioxidant can be provided, for example, through inlet 28 near the end of the melt-conveying zone. Referring to FIG. 2, primary antioxidant can be provided, for example, through inlet 50 near the end of the melt-conveying zone. It should be appreciated that these specific inlet positions are merely exemplary.

Examples of primary antioxidants, sometimes termed "long-term antioxidants," include phenolic antioxidants and hindered amine antioxidants, such as are disclosed in U.S. Pat. No. 6,392,056. Suitable primary antioxidants are available commercially, such as the IRGANOX™ antioxidants available from Ciba Specialty Chemicals.

Examples of phenolic antioxidants include:

octadecyl-3-(3,5-di-tert-butyl-4-hydroxyphenyl) propionate (IRGANOX™ 1076);

pentaerythritol tetrakis(3-(3,5-di-tert-butyl-4-hydroxyphenyl) propionate) (IRGANOX™ 1010);

3,3',3',5,5',5'-hexa-tert-butyl-a,a',a'-(mesitylene-2,4,6-triyl)tri-p-cresol (IRGANOX™ 1330);

1,3,5-tris(3,5-di-tert-butyl-4-hydroxybenzyl)-1,3,5-triazine-2,4,6(1H,3H,5H)-trione (IRGANOX™ 3114);

n-octadecyl-3,5-di-tert-butyl-4-hydroxyhydrocinnamate;

neopentanetetrayl tetrakis(3,5-di-tert-butyl-4-hydroxyhydrocinnammate);

di-n-octadecyl-3,5-di-tert-butyl-4-hydroxybenzylphosphonate, 1,3,5-tris(3,5-di-tert-butyl-4-hydroxybenzyl) isocyanurate;

thiodiethylene bis(3,5-di-tert-butyl-4-hydroxyhydrocinnamate);

1,3,5-trimethyl-2,4,6-tris(3,5-di-tert-butyl-4-hydroxybenzyl)benzene;

3,6-dioxaoctamethylene bis(3-methyl-5-tert-butyl-4-hydroxyhydrocinnamate);

2,6-di-tert-butyl-p-cresol;

2,2'-ethylidene-bis(4,6-di-tert-butylphenol);

1,3,5-tris(2,6-dimethyl-4-tert-butyl-3-hydroxybenzyl) isocyanurate;

1,1,3,-tris(2-methyl-4-hydroxy-5-tert-butylphenyl) butane;

1,3,5-tris[2-(3,5-di-tert-butyl-4-hydroxyhydrocinnamoyloxy)ethyl]isocyanurate;

3,5-di-(3,5-di-tert-butyl-4-hydroxybenzyl)mesitol;

hexamethylene bis(3,5-di-tert-butyl-4-hydroxyhydrocinnamate);

1-(3,5-di-tert-butyl-4-hydroxyanilino)-3,5-di(octylthio)-s-triazine;

N,N'-hexamethylene-bis(3,5-di-tert-butyl-4-hydroxyhydrocinnamamide);

calcium bis(ethyl 3,5-di-tert-butyl-4-hydroxybenzylphosphonate);

ethylene bis[3,3-di(3-tert-butyl-4-hydroxyphenyl) butyrate];

octyl 3,5-di-tert-butyl-4-hydroxybenzylmercaptoacetate;

bis(3,5-di-tert-butyl-4-hydroxyhydrocinnamoyl) hydrazide; and

N,N'-bis[2-(3,5-di-tert-butyl-4-hydroxyhydrocinnamoyloxy)-ethyl]-oxamide.

Examples of amines include:

bis(2,2,6,6-tetramethylpiperidin-4-y)sebacate;

bis(1,2,2,6,6-pentamethylpiperidin-4-yl)sebacate;

di(1,2,2,6,6-pentamethylpiperidin-4-yl)-(3,5-di-tert-butyl-4-hydroxybenzyl)butylmalonate;

4-benzoyl-2,2,6,6-tetramethylpiperidine;

4-stearyloxy-2,2,6,6-tetramethylpiperidine;

3-n-octyl-7,7,9,9-tetramethyl-1,3,8-triaza-spiro-[4.5] decane-2,4-dione;

tris(2,2,6,6-tetramethylpiperidin-4-yl)nitrilotriacetate;

1,2-bis(2,2,6,6-tetramethyl-3-oxopiperazin-4-yl)ethane;

2,2,4,4-tetramethyl-7-oxa-3,20-diaza-21-oxodispiro [5.1.1.2]heneicosane;

polycondensation product of 2,4-dichloro-6-tert-octylamino-s-triazine and 4,4'-hexamethylenebis(amino-2,2,6,6-tetramethylpiperidine);

polycondensation product of 1-(2-hydroxyethyl)-2,2,6,6-tetramethyl-4-hydroxypiperidine and succinic acid;

polycondensation product of 4,4'-hexamethylenebis-(amino-2,2,6,6-tetra-methylpiperidine) and 1,2-dibromoethane;

tetrakis(2,2,6,6-tetramethylpiperidin-4-yl)-1,2,3,4-butanetetracarboxylate;

tetrakis(1,2,2,6,6-pentamethylpiperidin-4-yl)-1,2,3,4-butanetetracarboxylate;

polycondensation product of 2,4-dichloro-6-morpholino-s-triazine and 4,4'-hexamethylenebis(amino-2,2,6,6-tetramethylpiperidine);

N,N',N'',N'''-tetrakis[(4,6-bis(butyl-1,2,2,6,6-pentamethyl-piperidin-4-yl)-amino-s-triazin-2-yl]-1,10-diamino-4,7-diazadecane;

mixed [2,2,6,6-tetramethylpiperidin-4-yl/β,β,β',β'-tetramethyl-3,9-(2,4,8,10-tetraoxaspiro[5.5]-undecanediethyl]1,2,3,4-butanetetracarboxylate;

mixed [1,2,2,6,6-pentamethylpiperidin-4-yl/β,β,β',β',-tetramethyl-3,9-(2,4,8,10-tetraoxaspiro[5.5-undecane) diethyl]1,2,3,4-butanetetracarboxylate;

octamethylene bis(2,2,6,6-tetramethyl-piperidin4-carboxylate);

4,4'-ethylenebis(2,2,6,6-tetramethylpiperazin-3-one);

N-2,2,6,6-tetramethyl-piperidin-4-yl-n-dodecylsuccinimide;

N-1,2,2,6,6-pentamethyl-piperidin-4-yl-n-dodecylsuccinimide;

N-1-acetyl-2,2,6,6-tetramethylpiperidin-4-yl-n-dodecylsuccinimide;

1-acetyl-3-dodecyl-7,7,9,9-tetramethyl-1,3,8-triazaspiro [4.5]decane-2,4-dione;

di-(1-octyloxy-2,2,6,6-tetramethylpiperidin-4-yl) sebacate;

di-(1-cyclohexyloxy-2,2,6,6-tetra-methylpiperidin-4-yl) succinate;

1-octyloxy-2,2,6,6-tetramethyl-4-hydroxy-piperidine;

poly-([6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino];

2,4,6-tris[N-(1-cyclohexyloxy-2,2,6,6-tetramethylpiperidin-4-yl)-n-butylamino]-s-triazine;

bis[1-(2-hydroxy-2-methylpropoxy)-2,2,6,6-tetramethylpiperidin-4-yl)]sebacate;

mixture of bis[1-(2-hydroxy-2-methylpropoxy)-2,2,6,6-tetramethylpiperidin-4-yl]glutarate and bis[1-(2-hydroxy-2-methylpropoxy)-2,2,6,6-tetramethylpiperidin-4-yl]adipate;

1-(2-hydroxy-2-methyl-propoxy)-4-octadecanoyloxy-2,2,6,6-tetramethylpiperidine;

bis[1-(2-hydroxy-2-methylpropoxy)-2,2,6,6-tetramethylpiperidin-4-yl]-adipate;

bis[1 (2-hydroxy-2-methylpropoxy]-2,2,6,6-tetramethyl-piperidin-4-yl]-glutarate;

bis[1-(2-hydroxy-2-methylpropoxy)-2,2,6,6-tetramethylpiperidin-4-yl]-succinate;

mixture of bis[1-(2-hydroxy-2-methylpropoxy)-2,2,6,6-tetramethylpiperidin-4-yl]glutarate and bis[1-(2-hydroxy-2-methylpropoxy)-2,2,6,6-tetramethylpiperidin-4-yl] succinate;

1-(4-octadecanoyloxy-2,2,6,6-tetramethylpiperidin-1-yloxy)-2-octadecanoyloxy-2-methylpropane;

1-(2-hydroxy-2-methylpropoxy)-4-[9-(methoxycarbonyl)nonanoyloxy]-2,2,6,6-tetramethylpiperidine;

1-(2-hydroxy-2-methylpropoxy)-4-[5-(methoxycarbonyl)pentanoyloxy]-2,2,6,6-tetramethylpiperidine;

1-(2-hydroxy-2-methylpropoxy)-4-[3-(methoxycarbonyl)propionyloxy]-2,2,6,6-tetramethylpiperidine;

1-(2-hydroxy-2-methylpropoxy)-4-[4-(methoxycarbonyl)-butyryloxy]-2,2,6,6-tetramethylpiperidine;

condensation product of 4-hydroxy-1-(2-hydroxy-2-methylpropoxy)-2,2,6,6-tetramethylpiperidine with hexamethylene diisocyanate and terminated with methoxy;

condensation product of 4-hydroxy-1-(2-hydroxy-ethoxy)-2,2,6,6-tetramethyl-piperidine with hexamethylene diisocyanate and terminated with methoxy; and condensation product of 4-hydroxy-1-(2-hydroxy-1-phenethoxy)-2,2,6,6-tetramethylpiperidine with hexamethylene diisocyanate and terminated with methoxy.

If desired, secondary antioxidants, sometimes termed "short-term antioxidants," can be used as conventional additives, and can be added to the mixer at any convenient location. Typical secondary antioxidants are available commercially, such as the IRGAFOS™ antioxidants available from Ciba Specialty Chemicals.

Examples of secondary antioxidants include, for example, aliphatic thiols and phosphites. Specific examples of secondary antioxidants include distearyl pentaerythritol diphosphite, isodecyl diphenyl phosphite, diisodecyl phenyl phosphite, tris(2,4-di-t-butylphenyl)phosphite, dilauryl-β,β-thiodipropionate, β-naphthyl disulfide, thiol-β-naphthol, 2-mercaptobenzothiazole, benzothiazyl disulfide, phenothiazine, tris(p-nonylphenyl)phosphite, and zinc dimethyldithiocarbamate.

A useful rheological parameter is the "Loss Tangent," also called "tan(δ)". Tan(δ) is the ratio of G" to G', where G" and G' are the loss (or viscous) and storage (or elastic) moduli, respectively. In oxygen tailoring of polyethylene, it is generally expected that the value of tan(δ) after oxygen tailoring, tan(δ)$_f$, will be significantly lower than the value of tan(δ) before oxygen tailoring, tan(δ)$_i$; i.e., the function Δ tan(δ) defined by:

$$\Delta\tan(\delta) = \frac{\tan(\delta)_i - \tan(\delta)_f}{\tan(\delta)_i}$$

is expected to be large. U.S. Pat. No. 5,739,266, for example, discloses an oxygen treatment process for polyethylene wherein the final value of the loss tangent is reportedly 15 to 70% less than the initial value. It should be appreciated that the function Δ tan(δ) is defined herein so that such a decrease in tan(δ) results in a positive value of the function Δ tan(δ).

In some embodiments, it has been surprisingly found that processes of the invention result in a very small loss in tan(δ); i.e., Δ tan(δ) is small, such as less than 15% or less than 12% or less than 10% or less than 8%. Typical lower limits of Δ tan(δ) can be 1% or 2% or 3%, with ranges from any lower limit to any upper limit being contemplated. As previously mentioned, in a preferred embodiment the value is less than 14%, more preferably less than 13% and yet even more preferably less than 12%. In a still more preferable embodiment the value is between about 12% and about 10%. Additional preferred embodiments include from about 12% to about 1% and also from about 10% to about 1%.

Films such as blown films formed of the oxygen-treated resin can have improved gauge uniformity, such as an average of less than 25% or less than 20% or less than 18% gauge variation.

EXAMPLES

Film gauge variation was determined using a Measuretech Series 200 instrument. This instrument measures film thickness using a capacitance gauge. For each film sample, ten film thickness datapoints are measured per inch of film as the film is passed through the gauge in a transverse direction. Three film samples were used to determine the gauge variation. The gauge variation was determined by dividing the full range of film thickness (maximum minus minimum) by the average thickness, and dividing the result by two. The gauge variation is presented as a percentage change around the average.

Dart Drop Impact values were measured using the procedures in ASTM D1709-98 Method A, except that the film gauge was measured according to ASTM D374-94 Method C. Dart drop values are F50 values, and are given in units of g/mil or g/μm.

Elmendorf Tear strength (machine direction, "MD", and transverse direction, "TD") was measured using the procedures in ASTM D1922-94a, except that the film gauge was measured according to ASTM D374-94 Method C. The values are given in units of g/mil or g/μm.

The term "Melt Index" refers to the melt flow rate of the resin measured according to ASTM D-1238, condition E (190° C., 2.16 kg load), and is conventionally designated as $I_{2.16}$. The term "Flow Index" refers to the melt flow rate of the resin measured according to ASTM D-1238, condition F (190° C., 21.6 kg load), and is conventionally designated as $I_{21.6}$. Melt index and flow index have units of g/10 min, or equivalently dg/min. The term "MFR" refers to the ratio $I_{21.6}/I_{2.16}$, and is dimensionless.

Specific Energy Input (SEI) refers to the energy input to the main drive of the extruder, per unit weight of melt processed resin, and is expressed in units of hp·hr/lb or kW·hr/kg.

"Loss Tangent," also called "tan(δ)", is the ratio of G" to G', where G" and G' are the loss (or viscous) and storage (or elastic) moduli, respectively. G' and G" were measured according to ASTM D-4440-84, and are expressed in units of pressure (Pa). Measurements were made at 200 C and a frequency of 0.1 s$^{-1}$, using a Rheometrics RMS 800 oscillatory rheometer.

Density (g/cm$^3$) was determined using chips cut from plaques compression molded in accordance with ASTM D-1928-96 Procedure C, aged in accordance with ASTM D618 Procedure A, and measured according to ASTM D1505-96.

1% Secant Modulus (machine direction, "MD", and transverse direction, "TD") was determined according to according to ASTM D882, and is given in units of psi or MPa.

Tensile at Yield and Ultimate Tensile (machine direction, "MD", and transverse direction, "TD") were determined according to ASTM D882, and are given in units of psi or MPa.

Peak Puncture Force was determined according to ASTM D3763, except that the film gauge was measured according to ASTM D374-94 Method C, and is given in units of lb/mil or N/μm.

Break Energy was determined according to ASTM D3763, except that the film gauge was measured according to ASTM D374-94 Method C, and is given in units of in-lb/mil or mJ/μm.

Color (Lc) was measured with a Hunter Lab calorimeter, using the polyethylene pellets In the following Examples, an HDPE blown film resin having a melt index $I_{2.16}$ of about 0.06 g/10 min, a high load melt index $I_{21.6}$ of about 10 g/10 min and a density of about 0.952 g/cm$^3$ was processed in a Kobe LCM 380G mixer with counter-rotating screws and an x-type rotor, at various melt temperatures and with various amounts of oxygen added. In each example where oxygen was used, the oxygen was added through an inlet in the mixing zone approximately as shown by inlet 26 in FIG. 1. Oxygen was provided as a continuous flow of dry air, containing 23 wt % O$_2$ (21 volume % O$_2$). Primary antioxidant (IRGANOX™ 1076)

was added (at inlet 28, FIG. 1) downstream of the oxygen addition. The resin mass flow rate was 55,000 lb/hr (25,000 kg/hr) in Examples 1–8, and 58,000 lb/hr (26,300 kg/hr) in Examples 9–28.

Monolayer blown films were produced from the oxygen-tailored resins on a 50 mm Alpine film line with a 120 mm die and 1.4 mm die gap, at a rate of 200 lb/hr (90 kg/hr), a blow up ratio (BUR) of 2.5:1, and a 38 inch frost height. The films had a nominal thickness of 0.5 mil (12.7 μm).

Film and resin properties are shown in Tables 1–4. Tables 0.1–4 illustrate changes in film characteristics as a function of amount of oxygen (airflow). The data show improvement in film gauge variation with minimal change in film impact properties until a threshold level is reached. Increased oxygen flow beyond this level may yield some further improvements in gauge variation, but film impact strength is significantly reduced. Film rheological properties change only slightly.

TABLE 1

| | 1 | 2 | 3 | 4 | 5 | 6 | 7 | 8 |
|---|---|---|---|---|---|---|---|---|
| $O_2$ (ppm wt) | 0 | 42 | 84 | 125 | 167 | 209 | 251 | 293 |
| Melt Temperature (° C.) | 213 | 213 | 213 | 213 | 213 | 213 | 213 | 213 |
| MI, $I_{2.16}$ (g/10 min) | 0.064 | 0.059 | 0.061 | 0.062 | 0.062 | 0.067 | 0.068 | 0.071 |
| HLMI, $I_{21.6}$ (g/10 min) | 11.8 | 11.6 | 11.7 | 11.9 | 11.9 | 12.3 | 12.3 | 12.6 |
| $I_{21.6}/I_{2.16}$ | 184 | 195 | 193 | 194 | 193 | 183 | 182 | 177 |
| Color, Lc | 86.0 | 54.4 | 84.9 | 84.5 | 84.7 | 80.2 | 78.0 | 76.4 |
| $M_w/M_n$ | 34.7 | 34.7 | 19.3 | 26.9 | 25.9 | 21.3 | 12.7 | 25.9 |
| G"/G' at 0.015 $s^{-1}$ | 1.85 | 1.75 | 1.64 | 1.72 | 1.56 | 1.56 | 1.54 | 1.54 |
| G"/G' at 0.1 $s^{-1}$ | 1.54 | 1.48 | 1.46 | 1.48 | 1.41 | 1.41 | 1.40 | 1.42 |
| Δ G"/G' at 0015 $s^{-1}$ (%) | 0 | 5.4 | 11.3 | 7.0 | 15.7 | 15.7 | 16.8 | 16.8 |
| Δ G"/G' at 0.1 $s^{-1}$ (%) | 0 | 3.90 | 5.19 | 3.90 | 8.44 | 8.44 | 9.09 | 7.79 |
| Melt Pressure (MPa) | 48.01 | 48.95 | 49.17 | 49.33 | 49.40 | 49.18 | 49.24 | 48.44 |
| Motor Load (%) | 133 | 134 | 134 | 136 | 140 | | 136 | 134 |
| Gauge, Average (mil) | 0.510 | 0.530 | 0.533 | 0.522 | 0.542 | 0.526 | 0.541 | 0.522 |
| Gauge, Average (μm) | 13.0 | 13.5 | 13.5 | 13.3 | 13.8 | 13.4 | 13.7 | 13.3 |
| Gauge Variation (%) | 36.2 | 32.1 | 22.5 | 20.8 | 18.7 | 17.6 | 15 | 18.7 |
| Elmendorf Tear, MD (g/mil) | 8.1 | 8.7 | 7.4 | 7.4 | 7.1 | 7.0 | 6.8 | 7.2 |
| Elmendorf Tear, MD (g/μm) | 0.32 | 0.34 | 0.29 | 0.29 | 0.28 | 0.28 | 0.27 | 0.28 |
| Elmendorf Tear, TD (g/mil) | 61.8 | 70.7 | 60.2 | 73.9 | 87.1 | 75.7 | 86.8 | 84.3 |
| Elmendorf Tear, TD (g/μm) | 2.43 | 2.78 | 2.37 | 2.91 | 3.43 | 2.98 | 3.42 | 3.32 |
| Elmendorf Tear TD/MD | 7.6 | 8.2 | 8.2 | 10.0 | 12.3 | 10.8 | 12.8 | 11.7 |
| Tensile at Yield, MD (MPa) | 63.07 | 58.96 | 67.85 | 50.67 | 56.88 | 57.06 | 59.57 | 60.30 |
| Tensile at Yield, TD (MPa) | 31.70 | 31.46 | 30.66 | 30.44 | 29.16 | 29.37 | 32.00 | 33.90 |
| Tensile Ultimate, MD (MPa) | 104 | 95.3 | 103 | 82.9 | 92.1 | 86.4 | 91.5 | 97.8 |
| Tensile Ultimate, TD (MPa) | 57.1 | 55.2 | 51.6 | 53.0 | 54.0 | 53.9 | 56.3 | 62.1 |
| 1% Secant Modulus, MD (MPa) | 1403 | 1605 | 1443 | 1509 | 1489 | 1392 | 1426 | 1436 |
| 1% Secant Modulus, TD (MPa) | 1384 | 1329 | 1376 | 1321 | 1361 | 1347 | 1356 | 1348 |
| Peak Puncture Force (lb/mil) | 21.1 | 17.1 | 18.4 | 17.8 | 16.7 | 17.4 | 17.2 | 16.1 |
| Peak Puncture Force (N/μm) | 3.69 | 2.99 | 3.22 | 3.12 | 2.92 | 3.05 | 3.01 | 2.82 |
| Break Energy (in-lb/mil) | 20.3 | 15.2 | 18.5 | 15.7 | 19.1 | 16.8 | 15.8 | 14.0 |
| Break Energy (mJ/μm) | 90.3 | 67.6 | 82.3 | 6.98 | 85.0 | 74.7 | 70.3 | 62.3 |
| Dart Impact (g/mil) | 240 | 214 | 221 | 230 | 204 | 179 | 166 | 128 |
| Dart Impact (g/μm) | 9.45 | 8.43 | 8.70 | 9.06 | 8.03 | 7.05 | 6.54 | 5.04 |

TABLE 2

| | 9 | 10 | 11 | 12 | 13 | 14 | 15 | 16 | 17 | 18 |
|---|---|---|---|---|---|---|---|---|---|---|
| $O_2$ (ppm wt) | 119 | 119 | 119 | 159 | 159 | 159 | 198 | 198 | 198 | 238 |
| Melt Temperature (° C.) | 199 | 204 | 213 | 199 | 204 | 213 | 199 | 204 | 213 | 199 |
| MI, $I_{2.16}$ (g/10 min) | 0.065 | 0.066 | 0.062 | 0.065 | 0.067 | 0.062 | 0.065 | 0.071 | 0.064 | 0.069 |
| G"/G' at 0.015 $s^{-1}$ | — | — | 1.64 | — | — | — | — | — | 1.72 | — |
| G"/G' at 0.1 $s^{-1}$ | 1.49 | 1.41 | 1.41 | 1.45 | 1.47 | — | 1.56 | — | 1.47 | 1.49 |
| Color Lc | 77.9 | 78.3 | 81.8 | 77.6 | 76.6 | 80.0 | 77.3 | 74.4 | 76.1 | 75.6 |
| Gauge, Average (mil) | 0.532 | 0.541 | 0.542 | 0.539 | 0.550 | 0.541 | 0.548 | 0.541 | 0.546 | 0.547 |
| Gauge, Average (μm) | 13.5 | 13.7 | 13.8 | 13.7 | 14.0 | 13.7 | 13.9 | 13.7 | 13.9 | 13.9 |
| Gauge Variation (%) | 24.2 | 19.6 | 16.5 | 16.7 | 19.4 | 18.3 | 18.3 | 16.2 | 17.2 | 17.0 |
| Elmendorf Tear, MD (g/mil) | 8.3 | 8.3 | 8.2 | 8.4 | 8.0 | 8.4 | 7.7 | 8.2 | 7.9 | 7.9 |
| Elmendorf Tear, MD (g/μm) | 0.33 | 0.33 | 0.32 | 0.33 | 0.31 | 0.33 | 0.30 | 0.32 | 0.31 | 0.31 |
| Elmendorf Tear, TD (g/mil) | 57.5 | 56.6 | 62.6 | 56.8 | 69.7 | 60.3 | 61.8 | 67.5 | 71.6 | 59.1 |
| Elmendorf Tear, TD (g/μm) | 2.26 | 2.23 | 2.46 | 2.24 | 2.74 | 2.37 | 2.43 | 2.66 | 2.82 | 2.33 |
| Elmendorf Tear TD/MD | 6.9 | 6.8 | 7.6 | 6.7 | 8.7 | 7.2 | 8.0 | 8.2 | 9.0 | 7.5 |
| Tensile at Yield, MD (MPa) | 66.2 | 62.5 | 62.3 | 58.4 | 58.0 | 56.6 | 65.0 | 61.2 | 60.9 | 59.8 |
| Tensile at Yield, TD (MPa) | 31.6 | 31.1 | 31.5 | 32.4 | 32.0 | 32.1 | 32.9 | 31.9 | 30.9 | 32.8 |
| Tensile Ultimate, MD (MPa) | 102 | 101 | 97.7 | 93.6 | 93.0 | 87.4 | 103 | 94.7 | 92.1 | 93.1 |
| Tensile Ultimate, TD (MPa) | 57.9 | 57.0 | 60.4 | 66.1 | 59.4 | 56.1 | 60.1 | 58.6 | 58.9 | 60.7 |
| 1% Secant Modulus, MD (MPa) | 1478 | 1624 | 1417 | 1400 | 1521 | 1495 | 1531 | 1507 | 1504 | 1508 |
| 1% Secant Modulus, TD (MPa) | 1338 | 1409 | 1323 | 1325 | 1338 | 1312 | 1364 | 1389 | 1264 | 1279 |
| Peak Puncture Force (lb/mil) | 17.7 | 17.0 | 15.5 | 17.1 | 16.5 | 17.3 | 16.5 | 17.1 | 15.7 | 15.4 |
| Peak Puncture Force (N/μm) | 3.10 | 2.98 | 2.71 | 2.99 | 2.89 | 3.03 | 2.89 | 2.99 | 2.75 | 2.70 |

TABLE 2-continued

|  | 9 | 10 | 11 | 12 | 13 | 14 | 15 | 16 | 17 | 18 |
|---|---|---|---|---|---|---|---|---|---|---|
| Break Energy (in-lb/mil) | 13.9 | 13.5 | 13.7 | 15.3 | 13.4 | 14.5 | 11.9 | 14.7 | 13.5 | 12.9 |
| Break Energy (mJ/μm) | 61.8 | 60.0 | 60.9 | 68.1 | 59.6 | 64.5 | 52.9 | 65.4 | 60.0 | 57.4 |
| Dart Impact (g/mil) | 242 | 207 | 244 | 272 | 184 | 183 | 162 | 226 | 186 | 236 |
| Dart Impact (g/μm) | 9.53 | 8.15 | 9.61 | 10.7 | 7.24 | 7.20 | 6.38 | 8.90 | 7.32 | 9.29 |

TABLE 3

|  | 19 | 20 | 21 | 22 | 23 | 24 |
|---|---|---|---|---|---|---|
| $O_2$ (ppm wt) | 0 | 119 | 119 | 139 | 159 | 159 |
| Melt Temperature (° C.) |  | 204 | 213 | 209 | 204 | 213 |
| MI, $I_{2.16}$ (g/10 min) | 0.063 | 0.064 | 0.062 | 0.062 | 0.065 | 0.062 |
| HLMI, $I_{21.6}$ (g/10 min) | 10.73 | 11.34 | 10.89 | 11.15 | 11.49 | 11.17 |
| $I_{21.6}/I_{2.16}$ | 170 | 177 | 175 | 181 | 178 | 181 |
| G"/G' at 0.015 s$^{-1}$ | 2.27 | — | 1.85 | — | — | 1.89 |
| G"/G' at 0.1 s$^{-1}$ | 1.75 | — | 1.56 | — | — | 1.56 |
| Δ G"/G' at 0.015 s$^{-1}$ (%) | 0 | — | 18.5 | — | — | 16.7 |
| Δ G"/G' at 0.1 s$^{-1}$ (%) | 0 | — | 10.9 | — | — | 10.9 |
| Color Lc | 85.8 | 77.2 | 77.0 | 76.0 | 75.8 | 76.0 |
| Gauge, Average (mil) | 0.514 | 0.507 | 0.516 | 0.521 | 0.515 | 0.503 |
| Gauge, Average (μm) | 13.1 | 12.9 | 13.1 | 13.2 | 13.1 | 12.8 |
| Gauge Variation (%) | 27.2 | 24.9 | 21.6 | 22.7 | 28.1 | 23.9 |
| Elmendorf Tear, MD (g/mil) | 8.5 | 7.5 | 7.8 | 9.2 | 7.7 | 8.0 |
| Elmendorf Tear, MD (g/μm) | 0.33 | 0.30 | 0.31 | 0.36 | 0.30 | 0.31 |
| Elmendorf Tear, TD (g/mil) | 51.2 | 50.1 | 53.2 | 75.1 | 48.8 | 59.1 |
| Elmendorf Tear, TD (g/μm) | 2.02 | 1.97 | 2.09 | 2.96 | 1.92 | 2.33 |
| Elmendorf Tear, TD/MD | 6.0 | 6.7 | 6.8 | 8.2 | 6.4 | 7.4 |
| Tensile at Yield, MD (MPa) | 53.8 | 55.4 | 57.8 | 48.9 | 54.4 | 52.7 |
| Tensile at Yield, TD (MPa) | 34.7 | 334 | 33.3 | 33.2 | 33.5 | 32.3 |
| Tensile Ultimate, MD (MPa) | 98.9 | 94.3 | 94.9 | 89.8 | 95.0 | 87.5 |
| Tensile Ultimate, TD (MPa) | 75.4 | 69.5 | 66.4 | 70.0 | 74.7 | 68.3 |
| 1% Secant Modulus, MD (MPa) | 1366 | 1491 | 1390 | 1185 | 1397 | 1257 |
| 1% Secant Modulus, TD (MPa) | 1189 | 1227 | 1202 | 1161 | 1254 | 1257 |
| Peak Puncture Force (lb/mil) | 20.3 | 19.7 | 17.8 | 18.8 | 19.4 | 17.9 |
| Peak Puncture Force (N/μm) | 3.55 | 3.45 | 3.12 | 3.29 | 3.40 | 3.13 |
| Break Energy (in-lb/mil) | 22.7 | 19.3 | 18.3 | 21.8 | 19.5 | 19.4 |
| Break Energy (mJ/μm) | 101 | 85.8 | 81.4 | 97.0 | 86.7 | 86.3 |
| Dart Impact (g/mil) | 377 | 381 | 335 | 395 | 348 | 356 |
| Dart Impact (g/μm) | 14.8 | 15.0 | 13.2 | 15.6 | 13.7 | 14.0 |

TABLE 4

|  | 25 | 26 | 27 | 28 |
|---|---|---|---|---|
| $O_2$ (ppm wt) | 0 | 155 | 0 | 159 |
| Melt Temperature (° C.) | 213 | 213 | 213 | 213 |
| MI, $I_{2.16}$ (g/10 min) | 0.059 | 0.062 | 0.061 | 0.064 |
| HLMI, $I_{21.6}$ (g/10 min) | 9.98 | 10.5 | 10.4 | 10.1 |
| $I_{21.6}/I_{2.16}$ | 168 | 170 | 169 | 159 |
| G"/G' at 0.015 s$^{-1}$ | 2.04 | 1.78 | 1.82 | 1.85 |
| G"/G' at 0.1 s$^{-1}$ | 1.54 | 1.49 | 1.52 | 1.54 |
| ΔG"/G' at 0.015 s$^{-1}$ (%) | 0 | 12.7 | 0 | 0 |
| ΔG"/G' at 0.1 s$^{-1}$ (%) | 0 | 3.2 | 0 | (1.0) |
| Color Lc | 85.0 | 77.0 | 85.4 | 77.7 |
| Gauge, Average (mil) | 0.508 | 0.518 | 0.497 | 0.508 |
| Gauge, Average (μm) | 12.9 | 13.2 | 12.6 | 12.9 |
| Gauge Variation (%) | 25.8 | 15.6 | 18.2 | 16.4 |
| Elmendorf Tear, MD (g/mil) | 8.3 | 7.8 | 9.8 | 9.6 |
| Elmendorf Tear, MD (g/μm) | 0.33 | 0.31 | 0.39 | 0.38 |
| Elmendorf Tear, TD (g/mil) | 52.9 | 60.2 | 49.7 | 51.2 |
| Elmendorf Tear, TD (g/μm) | 2.08 | 2.37 | 1.96 | 2.02 |
| Elmendorf Tear TD/MD | 6.4 | 7.7 | 5.1 | 5.3 |
| Tensile at Yield, MD (MPa) | 63.2 | 59.0 | 56.0 | 52.9 |
| Tensile at Yield, TD (MPa) | 33.9 | 31.6 | 34.4 | 34.2 |
| Tensile Ultimate, MD (MPa) | 103 | 86.6 | 91.9 | 88.9 |
| Tensile Ultimate, TD (MPa) | 74.5 | 63.0 | 82.5 | 73.3 |
| 1% Secant Modulus, MD (MPa) | 1378 | 1324 | 1401 | 1358 |
| 1% Secant Modulus, TD (MPa) | 1321 | 1270 | 1236 | 1287 |
| Peak Puncture Force (lb/mil) | 17.6 | 15.8 | 18.7 | 19.4 |
| Peak Puncture Force (N/μm) | 3.08 | 2.77 | 3.27 | 3.40 |
| Break Energy (in-lb/mil) | 13.6 | 13.4 | 17.6 | 21.7 |
| Break Energy (mJ/μm) | 60.5 | 59.6 | 78.3 | 96.5 |
| Dart Impact (g/mil) | 339 | 309 | 343 | 371 |
| Dart Impact (g/μm) | 13.3 | 12.2 | 13.5 | 14.6 |

All patents, test procedures, and other documents cited herein, including priority documents, are fully incorporated by reference to the extent such disclosure is not inconsistent with this invention and for all jurisdictions in which such incorporation is permitted.

What is claimed is:

1. A process for oxygen-tailoring polyethylene resin, the process comprising:

(a) conveying polyethylene resin in a downstream direction through a feed zone, a melt-mixing zone downstream of the feed zone, and a melt zone downstream of the melt-mixing zone;

(b) contacting the resin with oxygen in an amount of at least 40 parts by weight $O_2$ per million parts by weight resin (ppm (wt) $O_2$); and (c) contacting the resin with primary antioxidant, wherein step (c) is carried out downstream of step (b).

2. The process of claim 1, wherein the amount of $O_2$ is from 40 to 300 ppm (wt) $O_2$.

3. The process of claim 1, wherein the amount of $O_2$ is from 80 to 240 ppm (wt) $O_2$.

4. The process of claim 1, wherein contacting the resin with oxygen comprises providing $O_2$ in the feed zone.

5. The process of claim 1, wherein contacting the resin with oxygen comprises providing $O_2$ in the melt-mixing zone.

6. The process of claim 4 or 5, wherein contacting the resin with primary antioxidant comprises providing primary antioxidant in the melt zone.

7. The process of claim 4 or 5, wherein $O_2$ is provided in a gas mixture.

8. The process of claim 1, wherein the primary antioxidant comprises phenolic antioxidant, hindered amine antioxidant, or mixtures thereof.

9. The process of claim 1, further comprising contacting the resin with secondary antioxidant.

10. The process of claim 1, wherein the polyethylene resin has a density of at least 0.930 g/cm$^3$.

11. The process of claim 1, wherein the polyethylene resin has a density of at least 0.945 g/cm$^3$.

12. The process of claim 1, wherein the polyethylene resin has a bimodal molecular weight distribution.

13. The process of claim 1, wherein the polyethylene resin has a ratio $M_w/M_n$ of at least 15.

14. A process for extruding polyethylene resin, the process comprising:

(a) conveying polyethylene resin having an initial value of G"/G' ($\tan(\delta)_i$) in a downstream direction through a feed zone, a melt-mixing zone downstream of the feed zone, and a melt zone downstream of the melt-mixing zone;

(b) contacting the resin with oxygen in an amount of at least 40 parts by weight $O_2$ per million parts by weight resin (ppm (wt) $O_2$); and (c) contacting the oxygen-contacted resin with primary antioxidant, to produce polyethylene resin having a final value of G"/G' ($\tan(\delta)_f$), wherein the change Δ in tan(δ) defined by $$\Delta\tan(\delta) = \frac{\tan(\delta)_i - \tan(\delta)_f}{\tan(\delta)_i}$$

is less than 15%.

15. The process of claim 14, wherein the final value of G"/G' ($\tan(\delta)_f$) is less than 14%.

16. The process of claim 14, wherein the final value of G"/G' ($\tan(\delta)_f$) is less than 13%.

17. The process of claim 14, wherein the final value of G"/G' ($\tan(\delta)_f$) is less than 12%.

18. The process of claim 14, wherein the final value of G"/G' ($\tan(\delta)_f$) is between about 12% and 10%.

19. The process of claim 14, wherein the amount of $O_2$ is from 40 to 300 ppm (wt) $O_2$.

20. The process of claim 14, wherein the amount of $O_2$ is from 80 to 240 ppm (wt) $O_2$.

21. The process of claim 14, wherein contacting the resin with oxygen comprises providing $O_2$ in the feed zone.

22. The process of claim 14, wherein contacting the resin with oxygen comprises providing $O_2$ in the melt-mixing zone.

23. The process of claim 21, wherein contacting the oxygen-contacted resin with primary antioxidant comprises providing primary antioxidant in the melt zone.

24. The process of claim 22, wherein contacting the oxygen-contacted resin with primary antioxidant comprises providing primary antioxidant in the melt zone.

25. The process of claim 21, wherein $O_2$ is provided in a gas mixture.

26. The process of claim 22, wherein $O_2$ is provided in a gas mixture.

27. The process of claim 14, wherein Δ tan(δ) is from about 12% to about 1%.

28. The process of claim 14, wherein Δ tan(δ) is from about 12% to about 10%.

29. The process of claim 14, wherein the primary antioxidant comprises phenolic antioxidant, hindered amine antioxidant, or mixtures thereof.

30. The process of claim 14, further comprising contacting the resin with secondary antioxidant.

31. The process of claim 14, wherein $\tan(\delta)_i$ is from 0.5 to 3.0 measured at a frequency of 0.015 s$^{-1}$.

32. The process of claim 14, wherein the polyethylene resin has a density of at least 0.930 g/cm$^3$.

33. The process of claim 14, wherein the polyethylene resin has a density of at least 0.945 g/cm$^3$.

34. The process of claim 14, wherein the polyethylene resin has a bimodal molecular weight distribution.

35. The process of claim 14, wherein the polyethylene resin has a ratio $M_w/M_n$ of at least 15.

36. A process for oxygen-tailoring a high density polyethylene resin having a bimodal molecular weight distribution, the process comprising:

(a) conveying polyethylene resin having a density of at least 0.945 g/cm$^3$, a ratio $M_w/M_n$ of at least 15, and an initial value of G"/G' ($\tan(\delta)_i$) in a downstream direction through a feed zone, a melt-mixing zone downstream of the feed zone, and a melt zone downstream of the melt-mixing zone;

(b) contacting the resin in the melt-mixing zone with oxygen in an amount of from 40 to 300 parts by weight $O_2$ per million parts by weight resin (ppm (wt) $O_2$); and (c) contacting the oxygen-contacted resin in the melt zone with primary antioxidant comprising phenolic antioxidant, hindered amine antioxidant, or a mixture thereof, to produce polyethylene resin having a final value of G"/G' ($\tan(\delta)_f$), wherein the change Δ in tan(δ) defined by $$\Delta\tan(\delta) = \frac{\tan(\delta)_i - \tan(\delta)_f}{\tan(\delta)_i}$$

is less than 15%.

37. The process of claim 36, wherein the final value of G"/G' ($\tan(\delta)_f$) is less than 14%.

38. The process of claim 36, wherein the final value of G"/G' ($\tan(\delta)_f$) is less than 13%.

39. The process of claim 36, wherein the final value of G"/G' ($\tan(\delta)_f$) is less than 12%.

40. The process of claim 36, wherein the final value of G"/G' ($\tan(\delta)_f$) is between about 12% and about 1%.

41. The process of claim 36, wherein the final value of G"/G' $(\tan(\delta)_f)$ is between about 12% and 10%.

42. The process of claim 36, wherein the amount of $O_2$ is from 80 to 240 ppm (wt) $O_2$.

43. The process of claim 36, wherein $O_2$ is provided in a gas mixture.

44. The process of claim 36 further comprising contacting the resin with secondary antioxidant.

45. The process of claim 36, wherein $\tan(\delta)_i$ is from 0.5 to 3.0 measured at a frequency of 0.015 $s^{-1}$.

* * * * *